(12) United States Patent
Abujbara et al.

(10) Patent No.: US 7,792,928 B2
(45) Date of Patent: Sep. 7, 2010

(54) METHOD FOR ESTABLISHING SECURE REMOTE ACCESS OVER A NETWORK

(75) Inventors: Nabil Abujbara, Irvine, CA (US); Abhijit Rao, Irvine, CA (US)

(73) Assignee: Canon Kabushiki Kaisha, Tokyo (JP)

( * ) Notice: Subject to any disclaimer, the term of this patent is extended or adjusted under 35 U.S.C. 154(b) by 219 days.

(21) Appl. No.: 12/034,549

(22) Filed: Feb. 20, 2008

(65) Prior Publication Data

US 2008/0209012 A1    Aug. 28, 2008

Related U.S. Application Data

(60) Provisional application No. 60/890,982, filed on Feb. 21, 2007.

(51) Int. Cl.
*G06F 15/16* (2006.01)
(52) U.S. Cl. .................. 709/219; 709/224; 709/225; 709/226; 726/10
(58) Field of Classification Search ................. 709/224, 709/225, 226, 219; 726/10
See application file for complete search history.

(56) References Cited

U.S. PATENT DOCUMENTS

| | | | |
|---|---|---|---|
| 5,642,515 A | 6/1997 | Jones et al. | |
| 7,031,699 B1 | 4/2006 | Andersen | |
| 2002/0004832 A1 | 1/2002 | Yoon et al. | |
| 2003/0009673 A1 | 1/2003 | Hayashi et al. | |
| 2003/0233332 A1 | 12/2003 | Keeler et al. | |
| 2004/0122948 A1 | 6/2004 | King | |
| 2005/0282531 A1 | 12/2005 | Andreasson | |
| 2006/0185007 A1* | 8/2006 | Hourselt | 726/10 |

FOREIGN PATENT DOCUMENTS

JP    20021766674 A  *  6/2002

* cited by examiner

*Primary Examiner*—Hassan Phillips
*Assistant Examiner*—Glenford Madamba
(74) *Attorney, Agent, or Firm*—Canon USA Inc IP Div

(57) ABSTRACT

A method and apparatus that provides means for remotely accessing a device over a network. The method and apparatus includes connecting, by a first device, to a server over a network for communication with a second device over the network, sending a request for remote access from the first device to the second device over the network by utilizing information provided by the server, storing, by the second device, remote access data in an image file, wherein the remote access data stored includes information to remotely access the second device or resources of the second device over the network, sending the image file with the remote access data to the first device over the network and accessing, by the first device, the second device or resources connected to the second device over using the remote access data stored in the image file.

21 Claims, 19 Drawing Sheets

COMPRESSED
IMAGE FILE
310

REMOTE ACCESS
INFORMATION
312

ATTRIBUTE DATA
314

IMAGE DATA
316

FIG. 3

```
┌─────────────────────────────────┐
│      UNCOMPRESSED               │
│      IMAGE FILE                 │
│         410                     │
│  ┌───────────────────────────┐  │
│  │   IMAGE FILE HEADER       │  │
│  │          412              │  │
│  └───────────────────────────┘  │
│                                 │
│  ┌───────────────────────────┐  │
│  │   IMAGE FILE DIRECTORY    │  │
│  │          414              │  │
│  │  ┌─────────────────────┐  │  │
│  │  │  IMAGE DIRECTORY    │  │  │
│  │  │       ENTRY         │  │  │
│  │  │        415          │  │  │
│  │  └─────────────────────┘  │  │
│  │                           │  │
│  │  ┌─────────────────────┐  │  │
│  │  │   REMOTE ACCESS     │  │  │
│  │  │ INFORMATION ENTRY   │  │  │
│  │  │        425          │  │  │
│  │  └─────────────────────┘  │  │
│  └───────────────────────────┘  │
└─────────────────────────────────┘
```

FIG. 4

REMOTE ACCESS
INFORMATION
312

REMOTE DEVICE
LOCATION
515

CLIENT IDENTIFIER
525

SUPPORTING IDENTIFIER
DATA
535

FIG. 5

METHOD FOR ESTABLISHING SECURE REMOTE ACCESS OVER A NETWORK

CROSS-REFERENCE TO RELATED PATENT APPLICATION

This application claims the right of priority under 35 U.S.C. §119(e) based on the U.S. Provisional Patent Application Ser. No. 60/890,982, filed Feb. 21, 2007, which is incorporated by reference herein in its entirety as if fully set forth herein.

BACKGROUND OF THE INVENTION

1. Field of the Invention

The present invention relates to remote access over a network and, more specifically, a method of establishing secure remote access over a network.

2. Description of the Related Art

Advancements in the field of communications and growth of the World Wide Web have led to the growth of global connectivity. The need for data to be accessed all over the globe is becoming the lifeline for major companies and their employees. Additionally, home users also demand global connectivity for personal and entertainment purposes. Home users away from their domicile desire access to their data at home for many everyday tasks. Both the corporate and home users, require a means of accessing their devices anytime and from anywhere in the world. Information and data stored in one location must be readily available to a user in a different location, on demand. With these devices connected to a network, this can be done through remote access.

Typically, to perform remote access over a network, a device requires information about the remote device/network. Additionally, the accessing device needs to send necessary information to authenticate itself to the remote device/network to be allowed to access the devices and/or services at the remote device/network. All the necessary information is classified as remote access information (RAI).

RAI is generally created by the remote device/network and sent to the device desiring remote access. This transfer has posed problems to users in the form of security and organization of received information. The information transfer between the remote device and accessing device requires authentication for security purposes. This can include things such as a user name and password entered by the accessing device user, which can then be verified by the remote device/network. The current methods of transferring RAI have assumed that the accessing device has a keyboard or an easy means of entering user information. This has not been the case with devices such as network connected mobile phones, network connected digital lifestyle devices like digital cameras, network connected televisions and, network connected personal digital assistants. Moreover, the current methods of transferring RAI usually incorporate weak security measures such as sending data in an unencrypted or bare format. This can pose problems with un-trusted devices and/or malicious devices, connected over the network, intercepting either the authentication information sent from the accessing device or, RAI information sent from the remote device.

Additionally, organization of received RAI becomes a problem for the user of an access device. Current methods store RAI as strings of characters and/or numbers. This makes it difficult for users to remember and identify which RAI is needed to connect to a specific device/network. Moreover, users usually have numerous RAI for all devices/networks they have access to. This makes distinguishing one RAI from another difficult if there are no distinguishing attributes.

Lastly, security of received RAI is also a concern at the access device end. Currently, RAI is created by the remote device for use by an access device that stores the RAI. This poses a problem if the access device is ever lost or stolen. The unauthorized individual in possession of the access device can now perform remote access to the remote device/network.

SUMMARY OF THE INVENTION

To solve the aforementioned problems, the present invention provides a method and program for establishing secure remote access over a network.

According to one aspect of the invention a method for remotely accessing a device over a network includes requesting remote access information from a first device coupled to the network by a second device coupled to the network, creating remote access information specific to the second device at the first device, sending the remote access information from the first device to the second device over the network, and processing the received remote access information at the second device.

Further features and advantages of the present invention will become apparent from the following description of exemplary embodiments (with reference to the attached drawings).

BRIEF DESCRIPTION OF THE DRAWINGS

FIG. 3 is a block diagram of a compressed image file with remote access information stored according to an embodiment of the present invention.

FIG. 4 is a block diagram of an uncompressed image file with remote access information stored according to an embodiment of the present invention.

FIG. 5 is a block diagram that illustrates remote access information according to an embodiment of the present invention.

DESCRIPTION OF THE EMBODIMENTS

Figure 1:
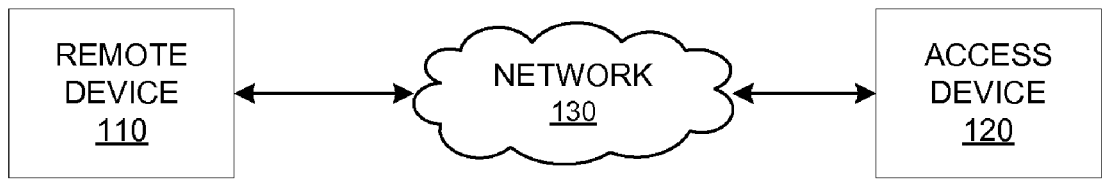
FIG. 1 is a block diagram illustrating a system for performing remote access over a network according to an embodiment of the present invention.

Exemplary embodiments of the present invention can provide means of secure remote access to a device/network over a service network. Pursuant to these exemplary embodiments, a device connected to a network requests remote access from another device connected to the network. The requestee remote device then sends remote access information in response to the request allowing access to the access device and/or devices and services associated with the remote device. The method enables a network-connected device, located away from a network-connected remote device, to connect and access data stored locally on the remote device and/or services or devices associated with the remote device over the network.

According to an embodiment of the invention, remote access information needed to connect a remote access device to a remote device and/or services or devices associated with the remote device, over a network, is stored within an image data of an image file.

According to an embodiment of the invention, the remote access information stored within the image data of the image file is encrypted so that only the user of the access device can decrypt and use it. Additionally, the remote device/network being accessed, embeds identifying information in the image data with the encrypted remote access information. This allows the access device to identify the creator and origin of the remote access information being received.

According to an embodiment of the invention, the image file containing remote access information depicts an image that is personal to the user of the access device and/or the user of the remote device, which the access device is attempting to access.

According to an embodiment of the invention, remote access information is transferred from a remote device to a remote access device by registering a unique identifier from the remote device with a server. Next, the same identifier is entered in at the access device. Then, the server sends information to contact the remote device to the remote access device allowing direct communication between both devices over the network allowing remote access information transfer.

According to an embodiment of the invention, remote access information is transferred from the remote device to the remote access device by a server comparing whether an image data sequence received from the remote device is identical to an image data sequence received from the remote access device. If the sequences are identical the server establishes a connection between both devices allowing transfer of the remote access information.

According to an embodiment of the invention, remote access information is transferred from the remote device to the remote access device by the remote device sending an access code and remote access information to the server. The remote device then sends the same access code to a mobile device associated with the user of the remote access device using a standard mobile messaging service. Then the user enters and sends the access code, at the access device, to the server allowing transfer of the remote access information.

According to an embodiment of the invention, remote access information is transferred from the remote device to the remote access device via an email attachment sent from the remote device to an email device associated with the access device.

FIG. 1 is a block diagram illustrating a system for performing remote access over a network according to an embodiment of the present invention. The system includes a remote device 110, a network 130, and an access device 120.

The network 130 can be any network allowing transport of data by any means between a remote device and an access device. In general, data can take the form of, but is not limited to, remote access information, electronic mail messages, and documents. The network 130 can be private or public, wired or wireless, in whole or in part.

The remote device 110 can be, but is not limited to, a personal computer, a digital lifestyle device such as a digital still image camera, digital video camera, television, or digital reading/display device that is communicatively coupled to the network 130. In general, the remote device 110 creates remote access information to transfer to the access device 120 over the network 130. This remote access information grants the access device 120, access to specific devices and services associated with the remote device 110. In an embodiment of the invention, the remote device stores remote access information 312 in an image file 410 send to the access device 120 after its creation.

The access device 120 can be, but is not limited to, a personal computer, a digital lifestyle device such as a digital still image camera, digital video camera, television, or digital reading/display device that is communicatively coupled to the network 130. Generally, the access device 120 is located away from the remote device 110 and, desires access to the remote device 110 and/or devices and services associated with the remote device 110 over the network 130. In doing so, the access device 120 sends a request for access over the network 130 to the remote device 110. In an embodiment of the invention, the remote device 110 creates remote access information in response to the request and sends the information to the access device 120 over the network 130. The access device 120 then processes the received remote access information and initializes remote access over the network 130.

Figure 2:
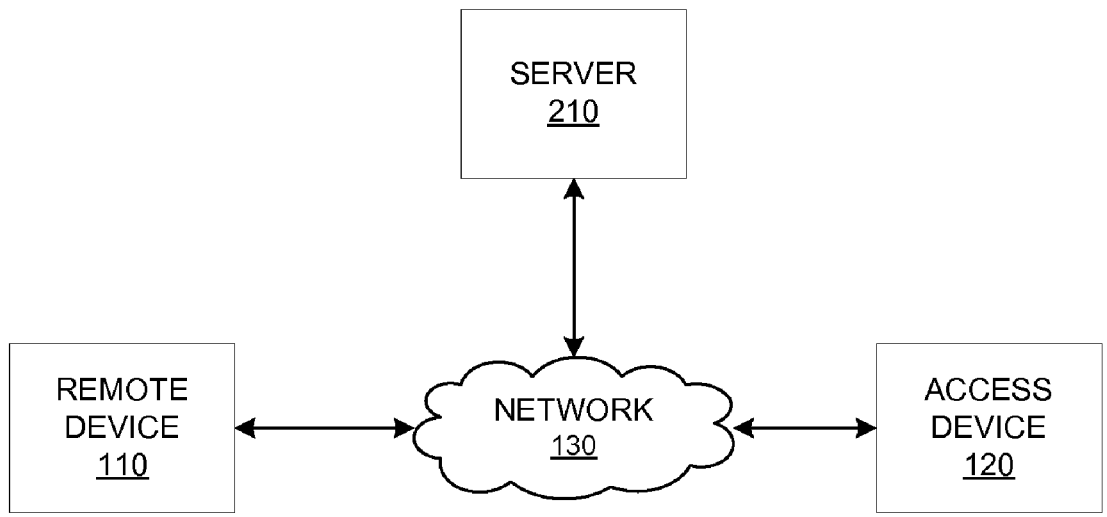
FIG. 2 is a block diagram illustrating a system for performing remote access over a network utilizing a server according to an embodiment of the present invention.

FIG. 2 is a block diagram illustrating a system for performing remote access over a network utilizing a server according to an embodiment of the present invention. The system includes a remote device 110, a network 130, a server 210 and an access device 120.

The network 130 can be any network allowing transport of data by any means between a remote device, a server, and an access device. In general, data can take the form of, but is not limited to, images, video, music, and documents. The network 130 can be private or public, wired or wireless, in whole or in part.

The server 210 can be any computer system or equivalent that provides services to other computing systems over a network. Generally, the server 210 manages information and/or has a mechanism for validation of information. In an embodiment of the invention, the server 210 provides identification of devices connected to the network 130 and is essentially a naming server. In another embodiment of the invention, the server 210 validates credentials sent by one device coupled to the network 130 with credentials sent by another device coupled to the network 130. In yet another embodiment of the invention, the server 210 stores data and manages access to this data over the network 130.

The remote device 110 can be, but is not limited to, a personal computer, a digital lifestyle device such as a digital still image camera, digital video camera, television, or digital reading/display device that is communicatively coupled to the network 130. In general, the remote device 110 creates remote access information to transfer to the access device 120 over the network 130. This remote access information grants the access device 120, access to specific devices and services associated with the remote device 110. In an embodiment of the invention, the remote device stores remote access information 312 in an image file 410 send to the access device 120 after its creation.

The access device 120 can be, but is not limited to, a personal computer, a digital lifestyle device such as a digital still image camera, digital video camera, television, or digital reading/display device that is communicatively coupled to the network 130. Generally, the access device 120 is located away from the remote device 110 and, desires access to the remote device 110 and/or devices and services associated with the remote device 110 over the network 130. In doing so, the access device 120 sends a request for access over the network 130 to the remote device 110. In an embodiment of the invention, the remote device 110 creates remote access information in response to the request and sends the information to the access device 120, over the network 130, through a server 210. The access device 120 then processes the received remote access information and initializes remote access over the network 130.

FIG. 3 is a block diagram of a compressed image file with remote access information stored according to an embodiment of the present invention. In general, the image file can be of any file format that allows specifying metadata and the image can be compressed, uncompressed, or any combination thereof. Designations are merely for explanation purposes and in no way limits an image file only to a certain type. In an embodiment of the invention, the remote access information 312 sent from the remote device 110 to the access device 120 is stored in a compressed image file 310. The compressed image file 310, with remote access information stored, includes attribute data 314, remote access information, and image data 316. In an embodiment of the invention, the remote device 110 uses a locally available compressed image file 310 to store remote access information 312 and send to the access device 120 over the network 130.

The attribute data 314 includes, but is not limited to, date and time information, camera settings, and descriptions of the image. This information provides the recipient of the image file 310 with useful attributes of the depicted image.

The remote access information 312 includes, but is not limited to, location of target network, client identifier, and security data. This information is used by the recipient of the image file 310 to remotely access a device over a network 130.

The image data 316 includes, but is not limited to, encoded data to view the image. An application decodes and reads this information to view the image file 310. Accordingly, the image is not affected by the presence of the remote access information 312 stored in the image file 310 and can be decoded and viewed normally.

FIG. 4 is a block diagram of an uncompressed image file with remote access information stored according to an embodiment of the present invention. The image file 410 can be of any file format that allows specifying metadata and the image can be compressed, uncompressed, or any combination thereof. Designations are merely for explanation purposes and in no way limits an image file only to a certain type. In an embodiment of the invention, the remote access information 312 sent from the remote device 110 to the access device 120 is stored in an uncompressed image file 310. The uncompressed image file 410 includes, but it not limited to, an image file header 412, an image file directory 414, an image directory entry 415, and remote access information entry 425.

The image file header 412 contains information to correctly interpret the uncompressed image file 410. Information includes, but is not limited to, byte order and offset to the image file directory 414.

The image file directory 414 is a data structure containing information on an image stored in the uncompressed image file 410. The size of the image file directory 414 is variable. In an embodiment of the invention, there is more than one image file directory 414 present. Generally, the number of image file directories 414 present within the uncompressed image file 410 will depend on the number of images stored on the uncompressed image file 410 with one for each image stored. Additionally, the image file directory 414 contains at least one image directory entry 415. In an embodiment of the invention, the image file directory contains at least one remote access information entry 425.

The image directory entry 415 includes, but is not limited to, information about the image such as tag, type, length and a value corresponding to image data. Similarly, the remote access information directory entry 425 includes, but is not limited to, information about the remote access information 312 such as tag, type, and a value corresponding to remote access information 312 data.

FIG. 5 is a block diagram that illustrates remote access information according to an embodiment of the present invention. Generally, the remote access information 312 allows the recipient access device 120 to remotely access the remote device 110 and/or devices and services associated with the remote device 110. The remote access information 312 includes, but is not limited to, remote device location 515, client identifier 525, and supporting identifier data 535. In an embodiment of the invention, the remote access information 312 is stored in an image file 410 by the remote device 110 for delivery.

The remote device location 515 provides the access device 120 with information to remotely connect with the remote device 110 and/or devices and services associated with the remote device 110 over the network 130. This includes, but is not limited to, internet protocol version, host name, port number, and/or session initiation protocol address.

The client identifier 525 is used for verifying the authenticity of the access device 120 upon granting remote access to the remote device 110 and/or devices and services associated with the remote device 110 over the network 130. The client identifier 525 can be, but is not limited to, a scheme utilizing an encrypted globally unique identifier, a digital certificate signed by the remote device 110, or a digital certificate signed by the remote access device 120.

The supporting identifier data 535 is used to support the specific client identifier. This can be data of any type for, but not limited to, executing, supporting, and/or maintaining the client identifier scheme.

Figure 6:
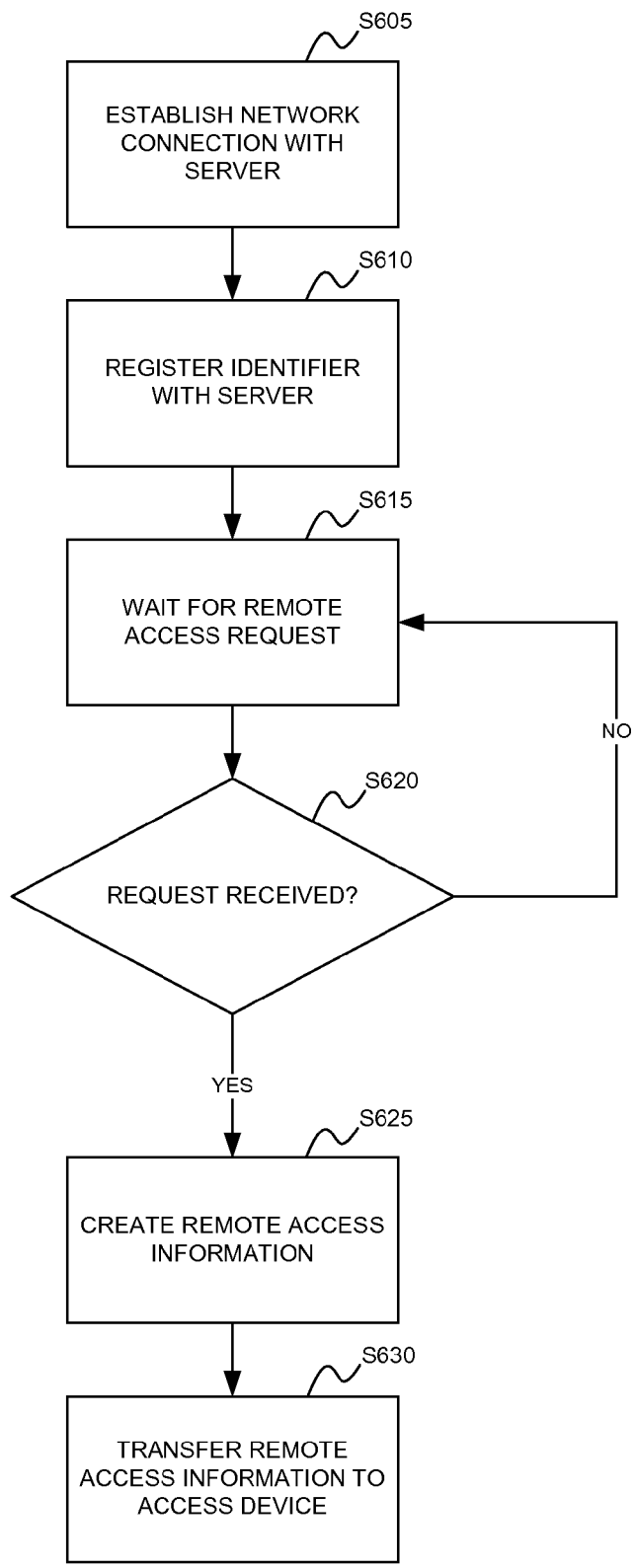
FIG. 6 is a flow diagram illustrating a remote device utilizing an identifier based method of transferring remote access information according to an embodiment of the present invention.

FIG. 6 is a flow diagram illustrating a remote device utilizing an identifier based method of transferring remote access information according to an embodiment of the present invention. In step S605, the remote device 110 establishes S605 a network connection with the server 210. In an embodiment of the present invention, the network connection between the remote device 110 and the server 210 is secure.

Once a connection has been established, in step S610 the remote device 110 registers an identifier with the server. The server 210 uses the identifier to identify the remote device from others on the network 130. In an embodiment of the invention, the identifier is unique to the remote device 110. Next, in step S615, the remote device 110 waits for a remote access request from the access device 120. If, in step S620, no request is received, the remote device 110 continues to wait for a request to be made.

If a request is received in step S620, flow proceeds to step S625, where the remote device 110 creates S625 remote access information 312 for the access device 120. Remote access information 312 can include, but is not limited to, information to access specific services and home network devices, location of home network, client identifier, and security data. After creation, the remote access information 312 is transferred to the access device 120 by the remote device 110 over the network 130 in step S630.

Figure 7:
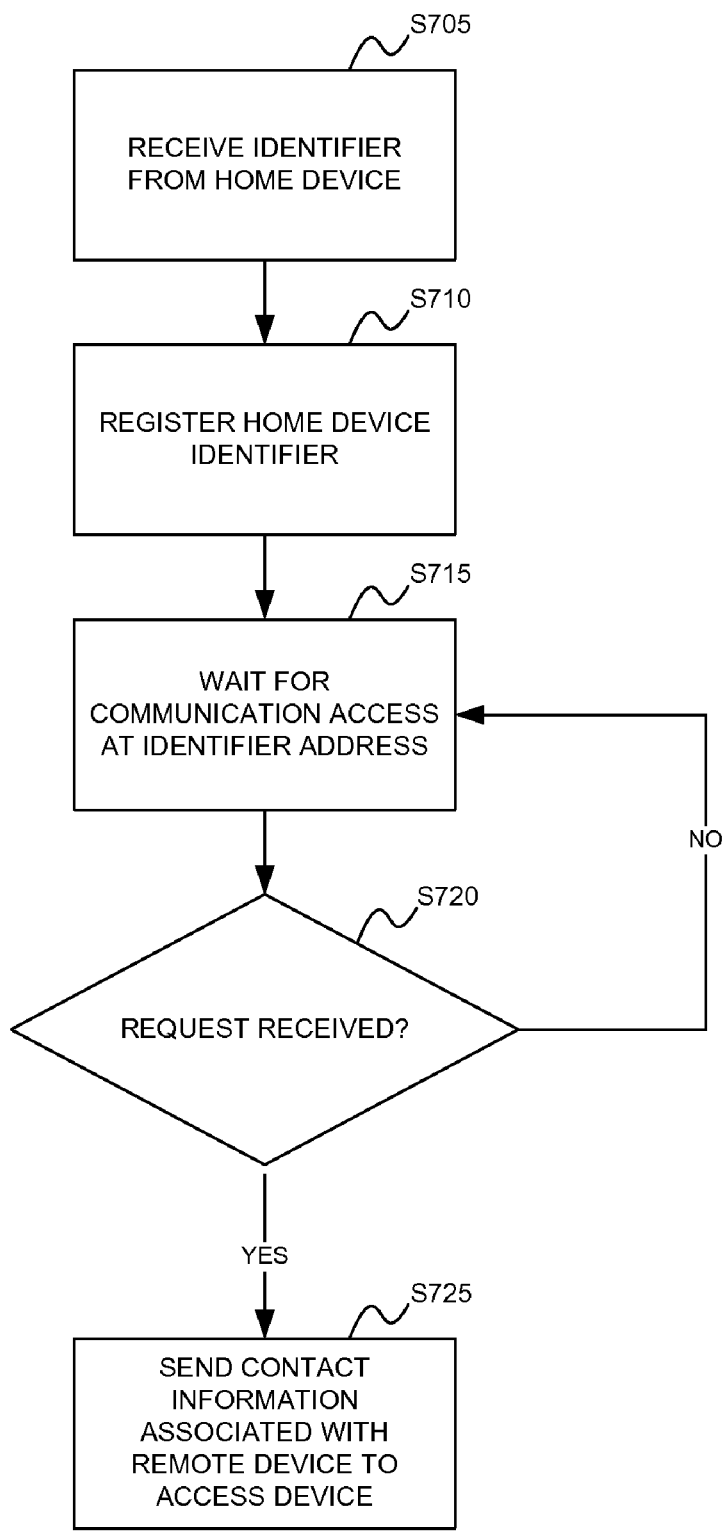
FIG. 7 illustrates a flow diagram of a server utilizing an identifier based method of transferring remote access information according to an embodiment of the present invention.

FIG. 7 illustrates a flow diagram of a server utilizing an identifier based method of transferring remote access information according to an embodiment of the present invention. In step S705, the server 210 receives an identifier from the remote device 110. Upon receiving the identifier, in step S710, the server 210 registers the identifier and associates it with the remote device 110.

After registering the identifier, the server 210 waits for a request for communication access by the access device 120 at the identifier address in step S715. If no request is received in step S720, the server 210 continues to wait until a request is made. If a request is received in step S720, the server 210 sends contact information, associated with the remote device 110 to the access device 120 in step S725.

Figure 8:
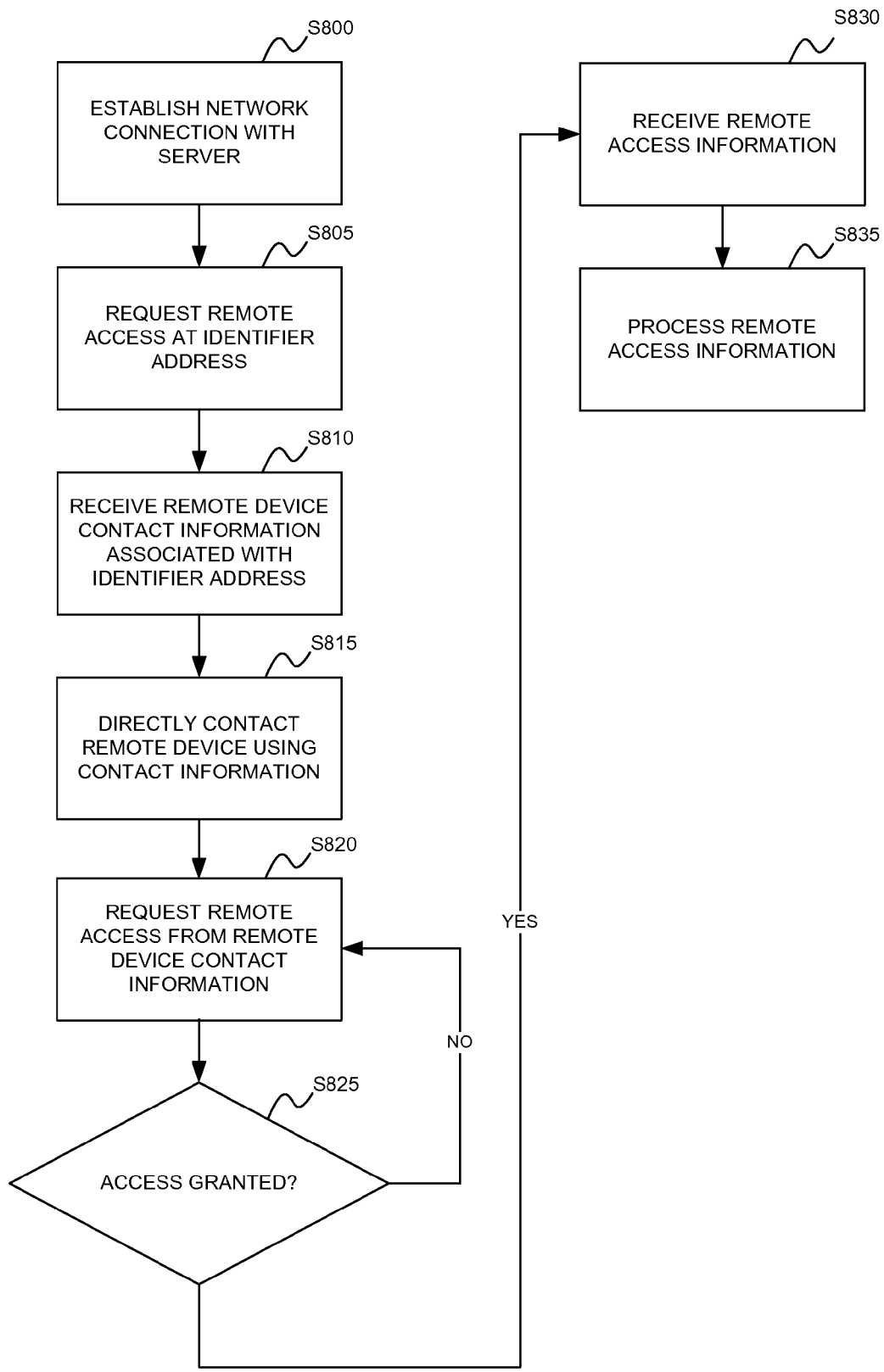
FIG. 8 is a flow diagram illustrating an access device utilizing an identifier based method of transferring remote access information according to an embodiment of the present invention.

FIG. 8 is a flow diagram illustrating an access device utilizing an identifier based method of transferring remote access information according to an embodiment of the present invention. In step S800, the access device 120 establishes a network 130 connection with the server 210. In an embodiment of the present invention, the network connection between the access device 120 and the server 210 is secure.

Upon connecting, in step S805 the access device 120 requests remote access at the specific identifier address corresponding to the remote device 110. In an embodiment of the invention, the identifier address is known at the access device 120 before a request for remote access is made. This can be from, but is not limited to, prior communications with the user of the remote device and/or prior dealings with the remote device 110 and/or user.

Next, in step S810, the access device 120 receives remote device 110 contact information, from the server 210. This provides the access device 120 with information to contact the remote device 110 directly over the network 130.

Flow then proceeds to step S815, where the access device 120 utilizes the contact information to directly contact S815 the remote device 110. In step S820, the access device 120 requests remote access from the remote device 110. If in step S825, it is determined that remote access is not granted, the access device 120 will continue to request access. If in step S825 it is determined that access is granted, flow proceeds to step S830 where the access device 120 receives remote access information 312 from the remote device 110 over the network 130. Then, the access device 120 will process S835 the remote access information 312 to perform remote access over the network 130.

Figure 9:
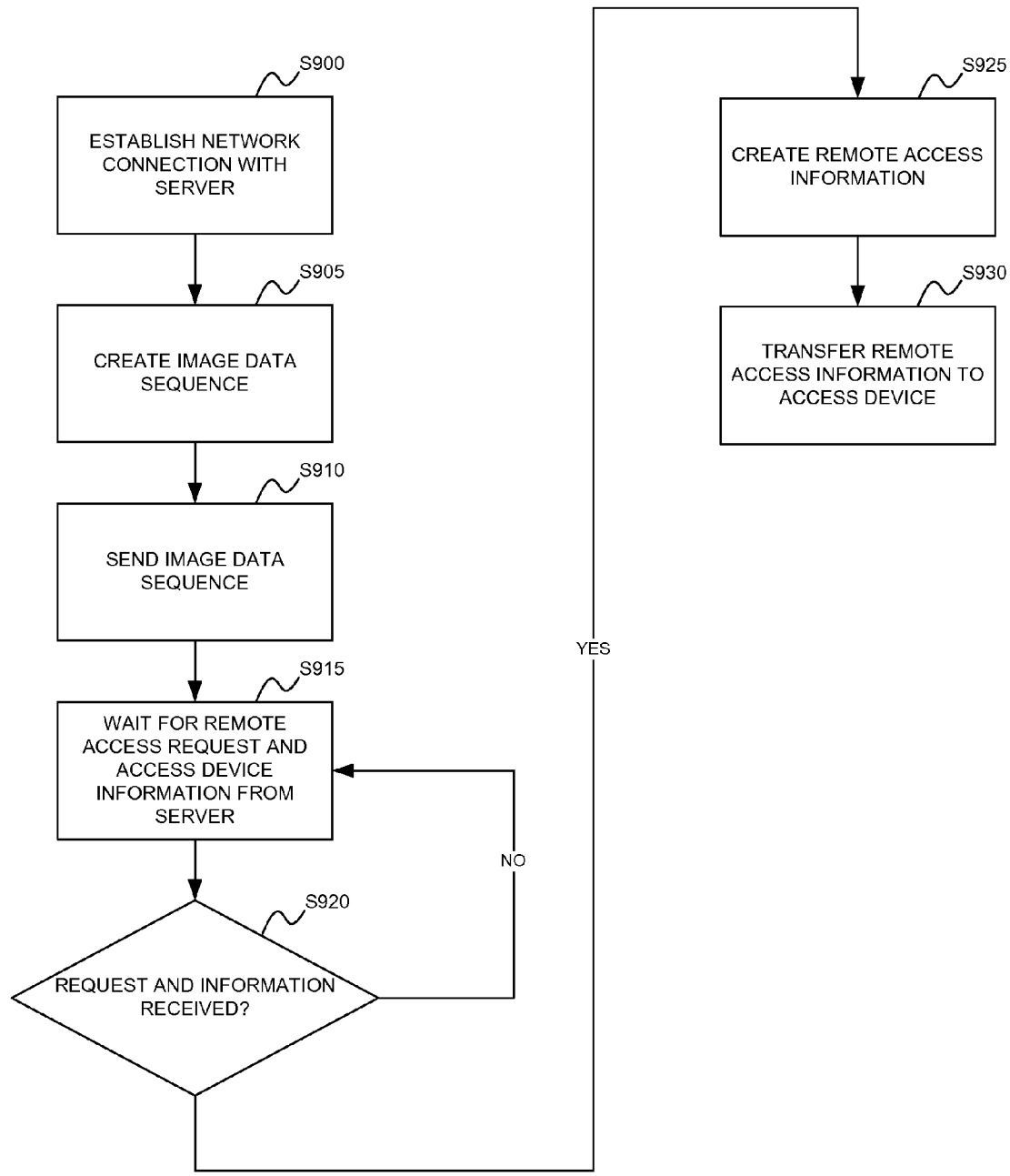
FIG. 9 is a flow diagram illustrating a remote device utilizing an image sequence method of transferring remote access information according to an embodiment of the present invention.

FIG. 9 is a flow diagram illustrating a remote device utilizing an image sequence method of transferring remote access information according to an embodiment of the present invention. In step S900, a network connection with the server 210 is established. In an embodiment of the present invention, the network connection between the remote device 110 and the server 210 is secure.

Once a connection is established, in step S905, the remote device creates an image data sequence. Generally, the image data sequence is a selection of images in a specific order, chosen by a user of the remote device 110, that corresponds to a numerical sequence. In an embodiment of the invention, the user of the remote device 110 and the user of the access device 120 previously agree on what the image data sequence will be. After creating the image data sequence, the remote device 110 sends the image data sequence to the server 210 over the network 130 in step S910.

After sending the image data sequence, in step S915, the remote device 110 waits for a request for remote access and for information about the access device 120. If, in step S920, it is determined that a request and information is not received, the remote device 110 continues to wait for a request and information. If, in step S920, a request and access device 120 information is received, then in step S925 the remote device 110 creates remote access information 312 for the access device 120. Remote access information can include, but is not limited to, information to access specific services and home network devices, location of home network, client identifier, and security data. After creation, the remote access information 312 is transferred to the access device 120 by the remote device 110 over the network 130 in step S930.

Figure 10:
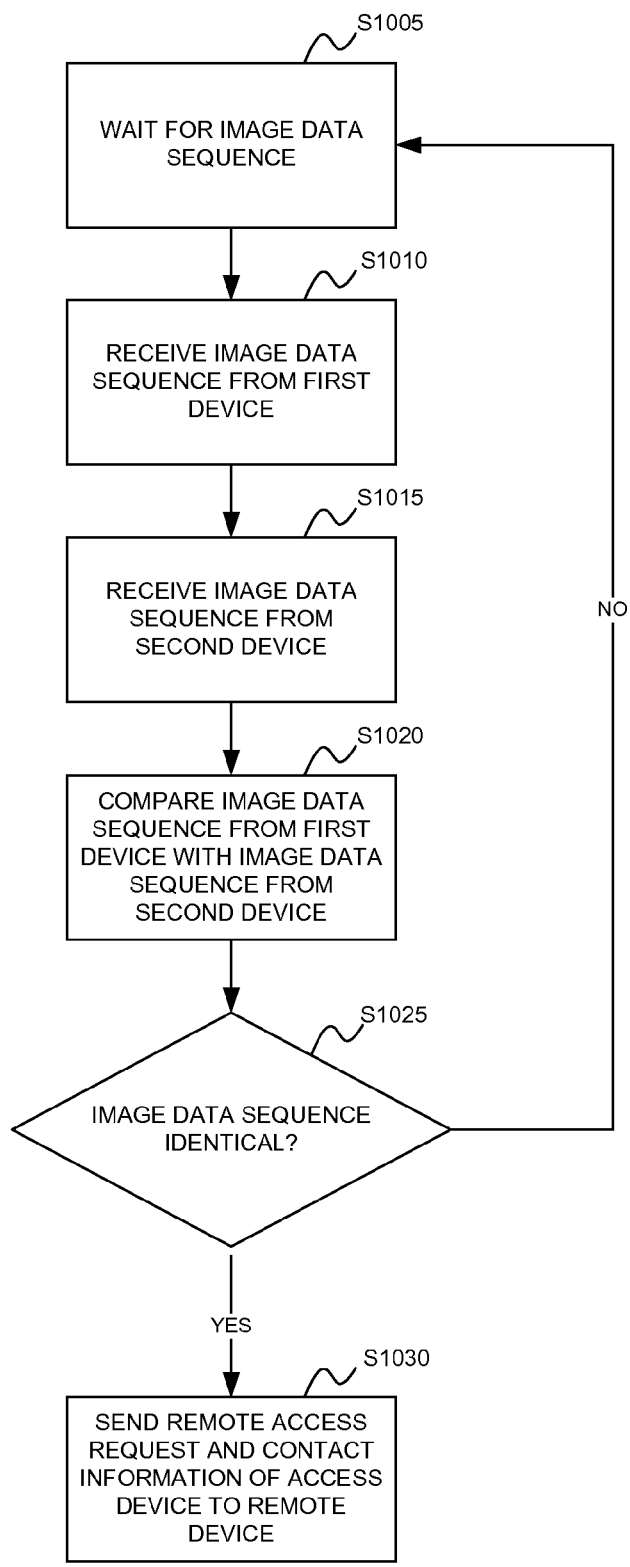
FIG. 10 is a flow diagram illustrating a server utilizing an image sequence method of transferring remote access information according to an embodiment of the present invention.

FIG. 10 is a flow diagram illustrating a server utilizing an image sequence method of transferring remote access information according to an embodiment of the present invention. In step S1005, the server 210 waits for an image data sequence from a device connectively coupled to the network 130. Next, in step S1010, the server 210 receives an image data sequence from a first device. Then in step S1015, the server 210 receives an image data sequence from a second device. In an embodiment of the invention, the first device is the remote device 110 and the second device is the access device 120 respectively.

In step S1020, the server 210 compares the image data sequence received from the first device with the image data sequence received from the second device. If, in step S1025, the image data sequences are not identical, the server 210 returns to waiting S1005 for an image data sequence to be received. If, in step S1025, the image data sequences are identical, the server 210 sends a remote access request on behalf of the access device 120 to the remote device 110 along with access device 120 details in step S1030. Details include, but are not limited to, access device 120 contact information and/or access device 120 configuration settings.

Figure 11:
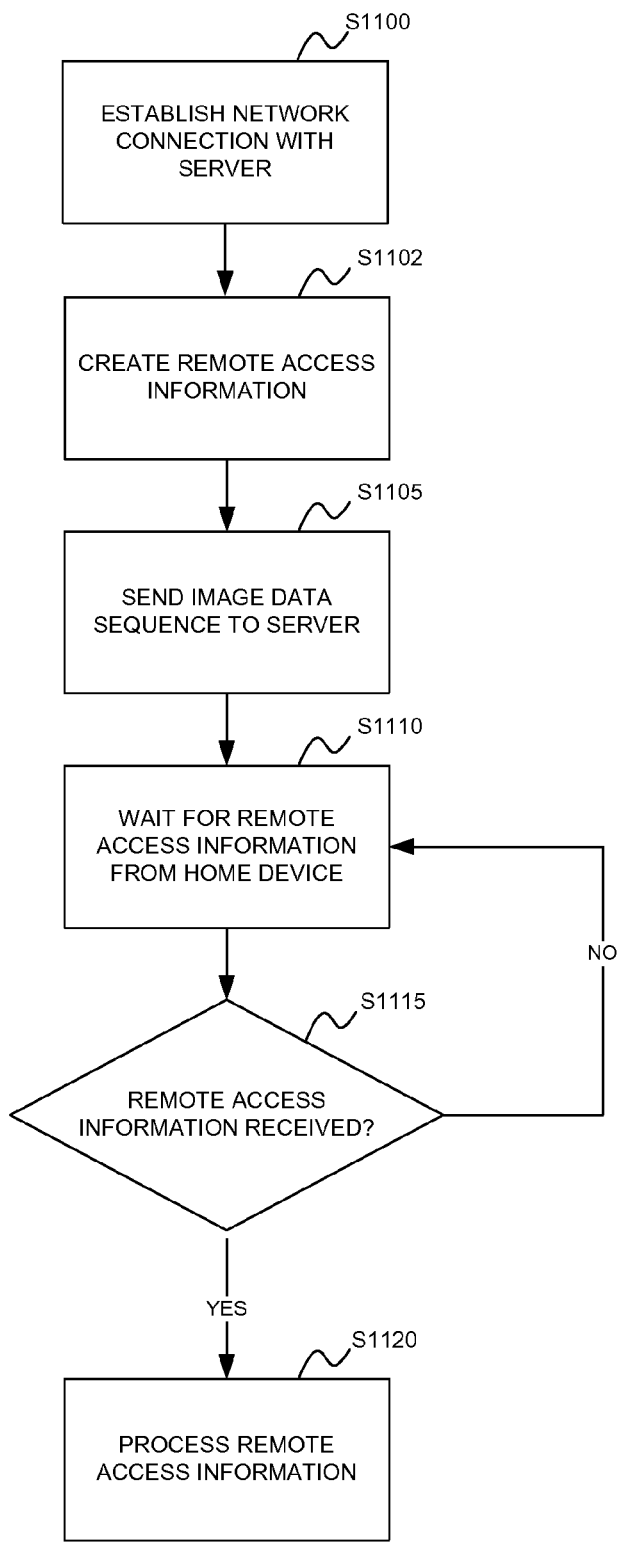
FIG. 11 is a flow diagram illustrating an access device utilizing an image sequence method of transferring remote access information according to an embodiment of the present invention.

FIG. 11 is a flow diagram illustrating an access device utilizing an image sequence method of transferring remote access information according to an embodiment of the present invention. In step S1100, the access device 120 establishes a network connection with the server 210. In an embodiment of the present invention, the network connection between the remote device 110 and the server 210 is secure.

Next, in step S1102, the access device creates an image data sequence. Generally, the image data sequence is a selection of images in a specific order, chosen by a user of the access device 120 that corresponds to a numerical sequence. In an embodiment of the invention, the user of the access device 120 and the user of the remote device 110 previously agree on what the image data sequence will be. After creating the image data sequence in step S1115, the access device 110 sends the image data sequence to the server 210 over the network 130.

Next, in step S1110, the access device waits for remote access information 312 from the remote device 110. If, in step S1115, remote access information 312 is not received from the remote device 110, the access device 120 continues to wait for the remote access information 312. If, in step S1115 remote access information 312 is received from the remote device 110, then in step S1120 the access device 120 processes the remote access information 312.

Figure 12:
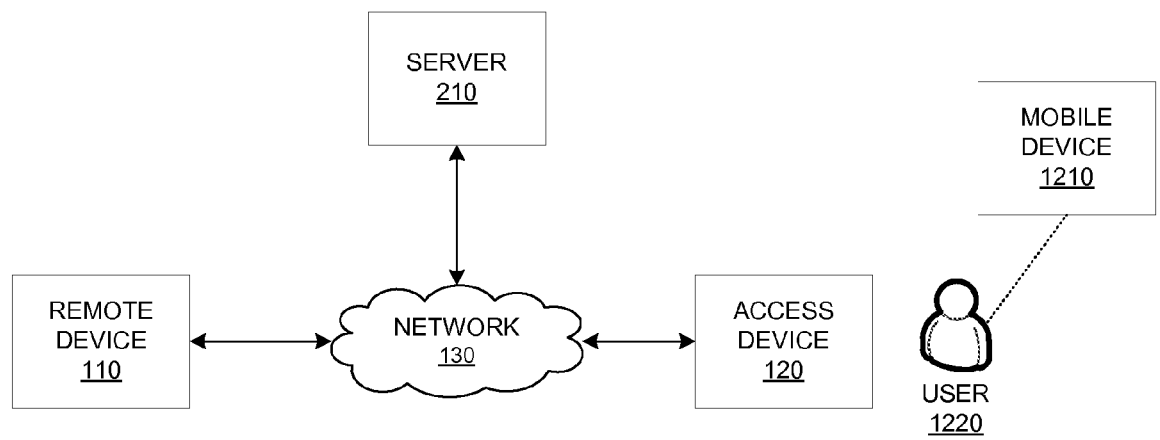
FIG. 12 is a block diagram illustrating a system for performing remote access over a network utilizing a messaging method.

FIG. 12 is a block diagram illustrating a system for performing remote access over a network utilizing a messaging method. The system includes a remote device 110, a network 130, a server 210, an access device 120, and a mobile device 1210.

The network 130 can be any network allowing transport of data by any means between a remote device, a server, and an access device. In general, data can take the form of, but is not limited to, images, video, music, and documents. The network 130 can be private or public, wired or wireless, in whole or in part.

The server 210 can be any computer system or equivalent that provides services to other computing systems over a network. Generally, the server 210 manages information and/or has a mechanism for validation of information. In an embodiment of the invention, the server 210 provides identification of devices connected to the network 130 and is essentially a naming server. In another embodiment of the invention, the server 210 validates credentials sent by one device coupled to the network 130 with credentials sent by another device coupled to the network 130. In yet another embodiment of the invention, the server 210 stores data and manages access to this data over the network 130.

The remote device 110 can be, but is not limited to, a personal computer, a digital lifestyle device such as a digital still image camera, digital video camera, television, or digital reading/display device that is communicatively coupled to the network 130. In general, the remote device 110 creates remote access information to transfer to the access device 120 over the network 130. This remote access information grants the access device 120, access to specific devices and services associated with the remote device 110. In an embodiment of the invention, the remote device stores remote access information 312 in an image file 410 send to the access device 120 after its creation.

The access device 120 can be, but is not limited to, a personal computer, a digital lifestyle device such as a digital still image camera, digital video camera, television, or digital reading/display device that is communicatively coupled to the network 130. Generally, the access device 120 is located away from the remote device 110 and, desires access to the remote device 110 and/or devices and services associated with the remote device 110 over the network 130.

The mobile device 1210 can be, but is not limited to, a cellular telephone, a personal digital assistant, or any wireless handheld device that allows receiving of messages from another device. Generally, the mobile device 1210 shares the same user 1220 as the access device 120. In an embodiment of the invention, the user 1220 of the access device 120 is in possession of the mobile device 1210. Additionally, the user 1220 receives information at the mobile device 1210 that the user 1220 inputs at the access device 120 to perform remote access.

Figure 13:
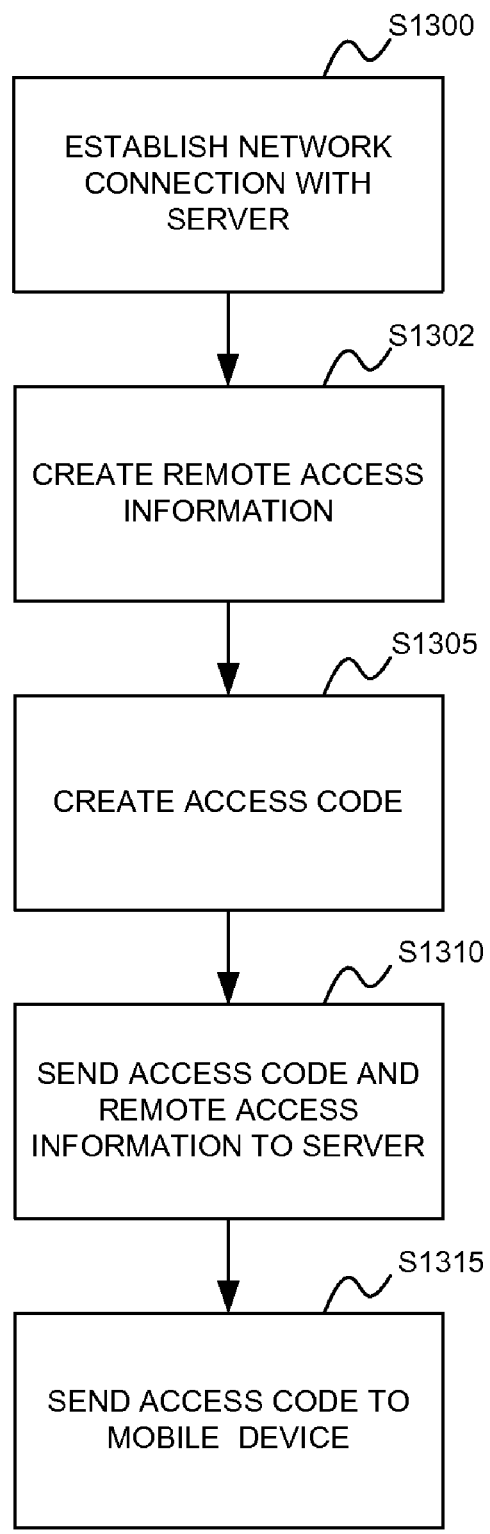
FIG. 13 is a flow diagram illustrating a remote device utilizing a messaging method of transferring remote access information according to an embodiment of the present invention.

FIG. 13 is a flow diagram illustrating a remote device utilizing a messaging method of transferring remote access information according to an embodiment of the present invention. In step S1300, the remote device 110 establishes a network connection with the server 210. In an embodiment of the present invention, the network connection between the remote device 110 and the server 210 is secure.

Next, in step S1302 the remote device 110 creates remote access information 312 for the access device 120. Remote access information 312 can include, but is not limited to, information to access specific services and home network devices, location of home network, client identifier, and security data. In an embodiment of the invention, the access device 120 is known at the remote device 110 prior to creating S625 remote access information.

After creation of the remote access information 312, the remote device 110 creates an access code in step S1305. The access code is used by the access device 120 to obtain the remote access information 312 on the server 210. After creating the access code, the remote device 110 then sends the remote access information 312 and access code to the server 210 over the network 130 in step S1310.

In step S1315, the remote device 110 sends the access code to a mobile device 1210 associated with the access device 120 using a standard messaging service or equivalent. This allows the access device 120 to retrieve the remote access information 312 on the server 210 from the remote device 110. In an embodiment of the invention, the mobile device 1210 can receive messages by short message service (SMS) and the access code is sent using SMS. Additionally, the user 1220 at the access device 120 is in possession of the mobile device 1210.

Figure 14:
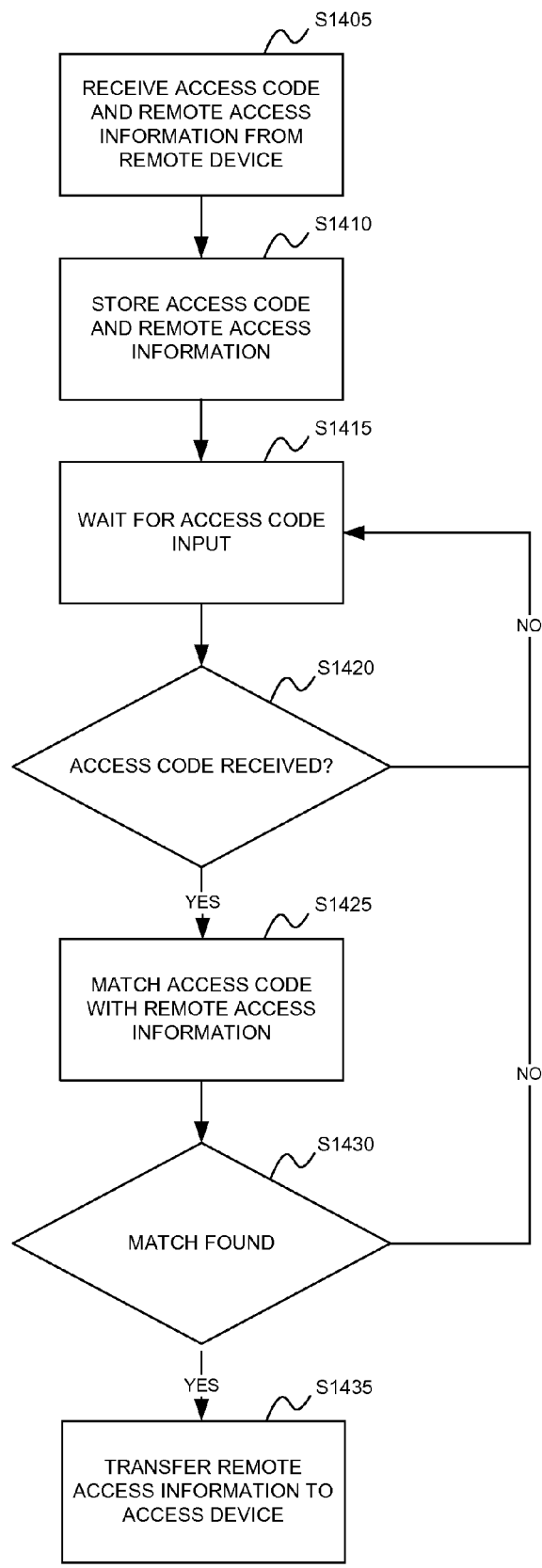
FIG. 14 is a flow diagram illustrating a server utilizing a messaging method of transferring remote access information according to an embodiment of the present invention.

FIG. 14. is a flow diagram illustrating a server utilizing a messaging method of transferring remote access information according to an embodiment of the present invention. In step S1405, the server receives remote access information 312 and an access code from the remote device 110 over the network 130. After receiving both the remote access information and access code, the server 210 stores the access code and remote access information 312 locally in step S1410.

Then, in step S1415, the server waits for access code input from the access device 120. If it is determined in step S1420, that no access code is received, the server 210 continues to wait S1415 for the entry of an access code. If it is determined in step S1420 that an access code is received S1420, flow proceeds to step S1425 where the server matches the access code with the associated remote access information 312.

In step S1430 a determination is made whether a match is found. If no match is found, the server 210 continues to wait S1415 for input of another access code. If a match is found, the server 210 transfers the associated remote access information 312 to the access device 120 in step S1435.

Figure 15:
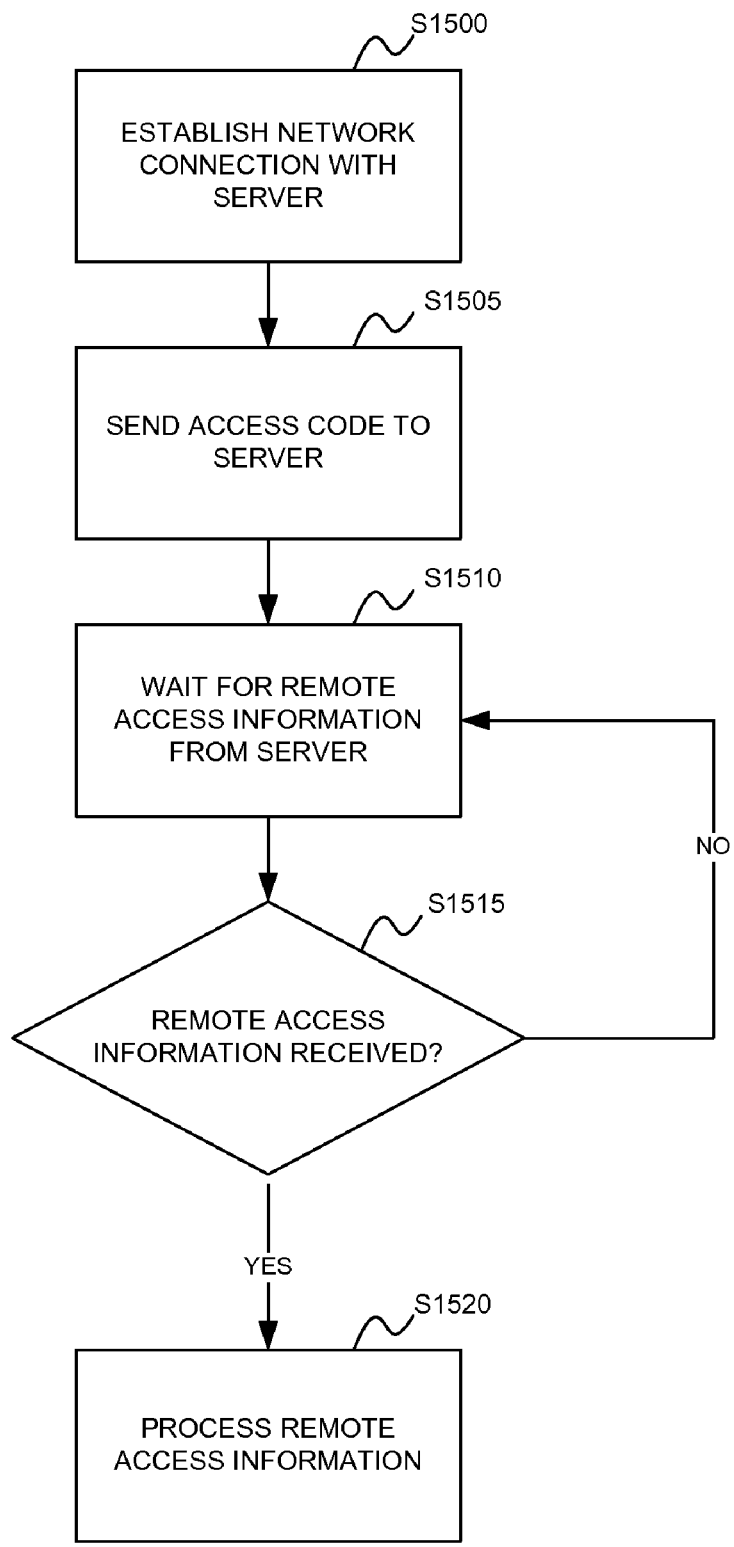
FIG. 15 is a flow diagram illustrating an access device utilizing a messaging method of transferring remote access information according to an embodiment of the present invention.

FIG. 15 is a flow diagram illustrating an access device utilizing a messaging method of transferring remote access information according to an embodiment of the present invention. In step S1500, the access device establishes a network connection with the server 210. In an embodiment of the present invention, the network connection between the access device 120 and the server 210 is secure.

Next, in step S1505, the access device 120 sends the access code to the server 210 associated with the remote device 110. In an embodiment of the invention, a user 1220 of the access device 120 inputs the access code. Moreover, the user 1220 receives the access code from the remote device 110 as a message on a mobile device 1210 in his possession.

After sending the access code, the access device 120 waits to receive remote access information 312 from the server 210 in step S1510. Then, in step S1515, a determination is made whether remote access information 312 is received. If no remote access information 312 is received from the server 210, the access device 120 continues to wait. If remote access information 312 is received from the server 210, flow proceeds to step S1520 where the access device 120 processes the remote access information 312 to perform remote access with the remote device 110.

Figure 16:
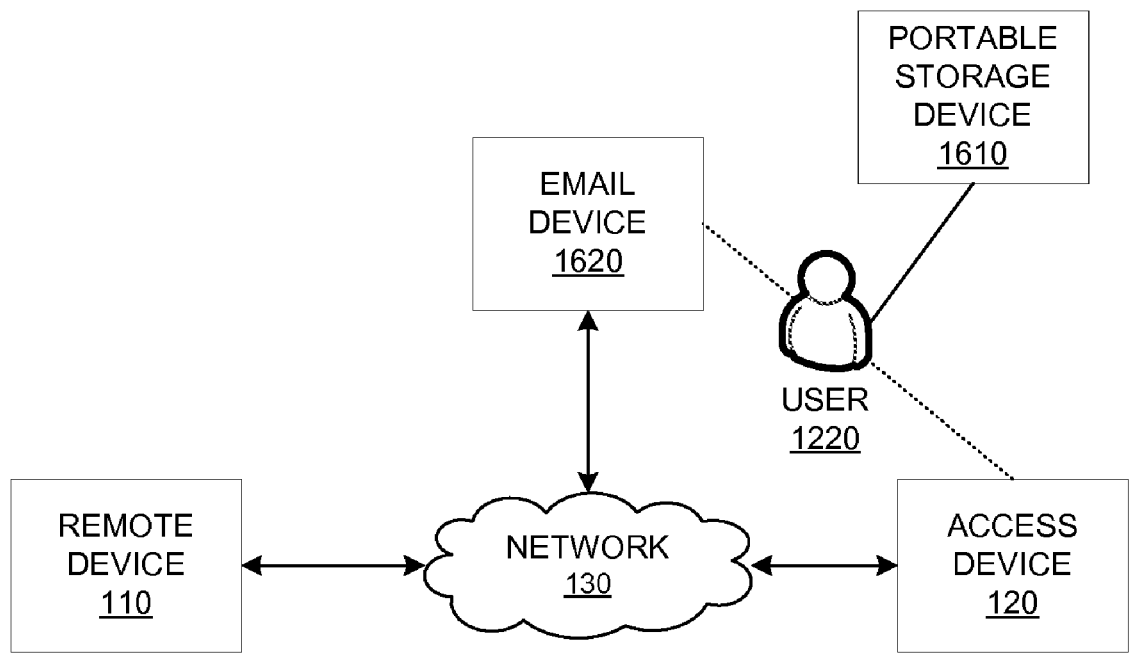
FIG. 16 is a block diagram illustrating a system for performing remote access over a network utilizing an email method.

FIG. 16 is a block diagram illustrating a system for performing remote access over a network utilizing an email method. The system includes a remote device 110, a network 130, an email device 1620, an access device 120, and a portable storage device 1610.

The network 130 can be any network allowing transport of data by any means between a remote device and an access device. In general, data can take the form of, but is not limited to, images, video, music, and documents. The network 130 can be private or public, wired or wireless, in whole or in part.

The remote device 110 can be, but is not limited to, a personal computer, a digital lifestyle device such as a digital still image camera, digital video camera, television, or digital reading/display device that is communicatively coupled to the network 130. In general, the remote device 110 is the device being accessed remotely by the access device 120 over the network. This allows the access device 120 to access data stored on the remote device 110 for use at another location. Access to the remote device 110, and/or devices and services associated with it, is granted to the access device 120 when the access device 120 obtains the proper remote access information 312. In an embodiment of the invention, the remote device 110 creates remote access information 312 specifically for the access device in response to a request. In another embodiment of the invention, the remote access information 312 is stored in an image file 410 by the remote device 110 to send to the access device 120, upon creation.

The access device 120 can be, but is not limited to, a personal computer, a digital lifestyle device such as a digital still image camera, digital video camera, television, or digital reading/display device that is communicatively coupled to the network 130. Generally, the access device 120 is located away from the remote device 110 and desires access to the remote device 110, and/or devices and services associated with it, to transfer data over the network 130. In doing so, the access device 120 sends a request for access over the network 130 to the remote device 110. In an embodiment of the invention, the remote device 110 creates remote access information 312 in response to the request for access and sends the information to the access device 120 over the network 130. The access device 120 then processes the received remote access information and initializes remote access over the network 130.

The email device can be, but is not limited to, a personal computer, a personal digital assistant, digital lifestyle device, television, or digital reading/display device that is communicatively coupled to the network 130 and is capable of sending and/or receiving electronic mail messages over the network 130. In an embodiment of the invention, the email device 1620 has an email client that can be used to send an electronic message to the remote device 110 and a slot to communicatively couple a portable storage device 1610. In yet another embodiment of the invention, the electronic message sent to the remote device 110 has an attachment obtained from the portable storage device 1610.

The portable storage device 1610 can be, but is not limited a universal serial bus (USB) flash drive, writeable media, or an external hard drive. Generally, the portable storage device 1610 is any device that can store data and be physically connected and transported at different locations to physically move data. In an embodiment of the invention, a user physically moves data back and forth between the access device 120 and the email device 1620 using the portable storage device.

Figure 17:
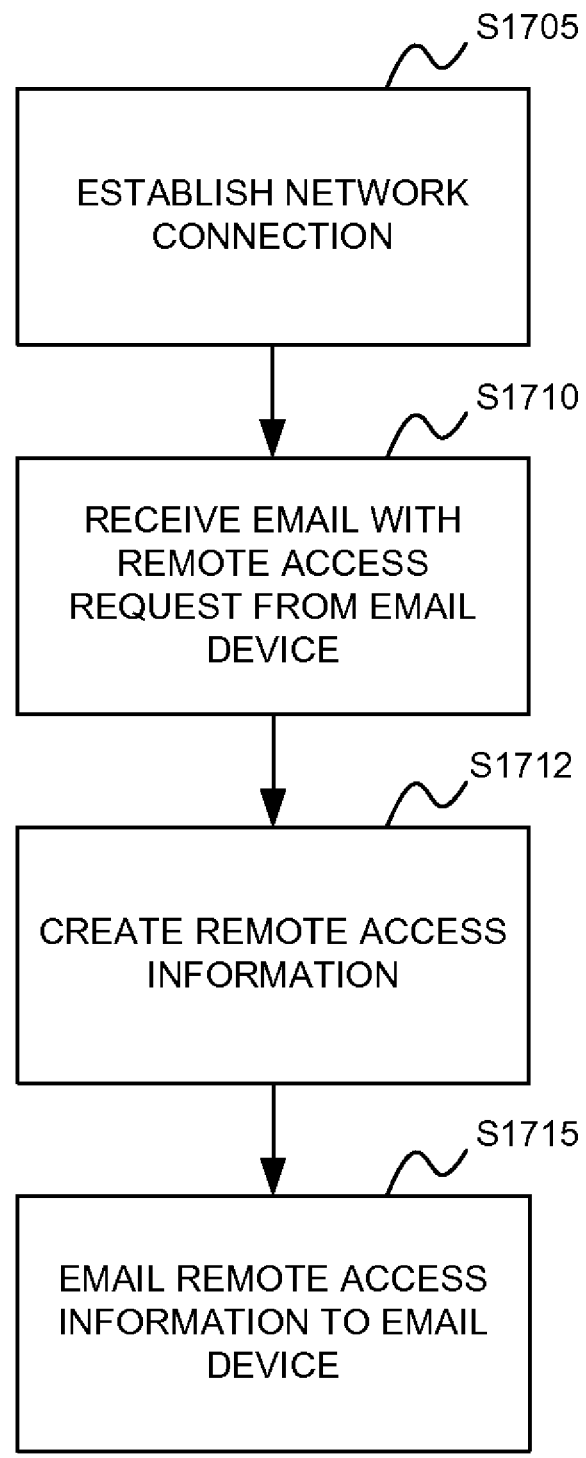
FIG. 17 is a flow diagram illustrating a remote device utilizing an email method of transferring remote access information according to an embodiment of the present invention.

FIG. 17 is a flow diagram illustrating a remote device utilizing an email method of transferring remote access information according to an embodiment of the present invention. In step S1705, the remote device 110 establishes a network 130 connection. Generally, once a connection is made, the remote device receives an email with an attachment from the email device 1620 in step S1710. The attachment includes a remote access request for the access device 120.

After receiving the request, the remote device 110 creates remote access information 312 for the access device 120 in step S1712. Remote access information 312 can include, but is not limited to, information to access specific services and home network devices, location of home network, client identifier, and security data. In step S1715, the remote device 110 emails the remote access information 312 to the email device 1620 over the network 130. In an embodiment of the invention, the remote access information 312 is stored on an image file and the image file with the remote access information is emailed as an attachment.

Figure 18:
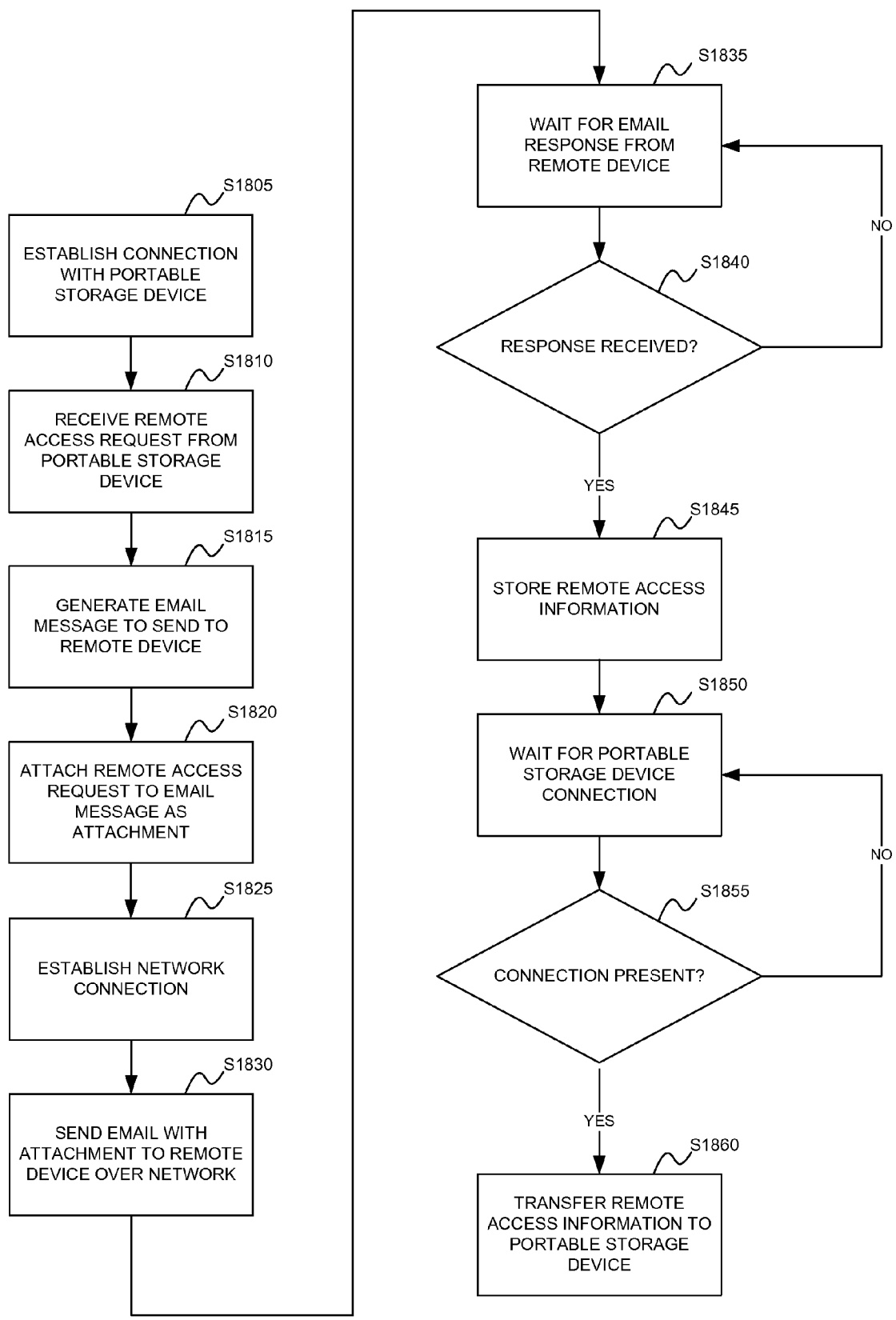
FIG. 18 is a flow diagram illustrating an email device utilizing an email method of transferring remote access information according to an embodiment of the present invention.

FIG. 18 is a flow diagram illustrating an email device utilizing an email method of transferring remote access information according to an embodiment of the present invention. In step S1805, the email device 1620 establishes a connection with the portable storage device 1610. In an embodiment of the invention, the portable storage device 1610 is connected to the email device 1620 by any means allowing the portable storage device 1610 to transfer data to and from the email device 1620. In yet another embodiment of the invention, a user 1220 physically connects the portable storage device 1610 to the email device 1620.

In step S1810, the email device 1620 receives receives data from the portable storage device 1610. This includes, but is not limited to, a remote access request and/or access device 120 attributes and settings. This data will be included as an attachment to an email sent to the remote device 110.

Next, the email device 1620 generates S1715 an email message to send to the remote device 110 in step S1815. In an embodiment of the invention, the email address of the remote device 110 user is known at the email device 1620 through prior communications and/or prior knowledge. After the email message is created, the email device 1620 in step S1820 attaches the data it received from the portable storage device 1610 to the email as an attachment. Then the email device 1620 establishes a network 130 connection and sends the email with attachment to the remote device 110 to request remote access information 312 over the network 130 in step S1830.

After sending the email with attachment, the email device 1620 waits for an email response with the remote access information 312 attachment from the remote device 110 in step S1835. Next, in step S1840, if no response is received, the email device 1620 continues to wait for an email response from the remote device 110 in step S1835. If a response is received, the email device 1620 stores the attachment locally in step S1845.

Flow then proceeds to step S1850, where the email device 1620 waits for a connection with the portable storage device 1610. In an embodiment of the invention, the user 1220 of the access device 120 connects the portable storage device 1610 to the email device 1620.

A determination is made in step S1855 whether a connection is present. If no connection is present, the email device 1620 continues to wait for the portable storage device 1610 to be connected. If a connection with the portable storage device 1610 is present, the email device 1620 transfers the attachment, including remote access information 312 received from the remote device 110, from local storage to the portable storage device 1610 in step S1860.

Figure 19:
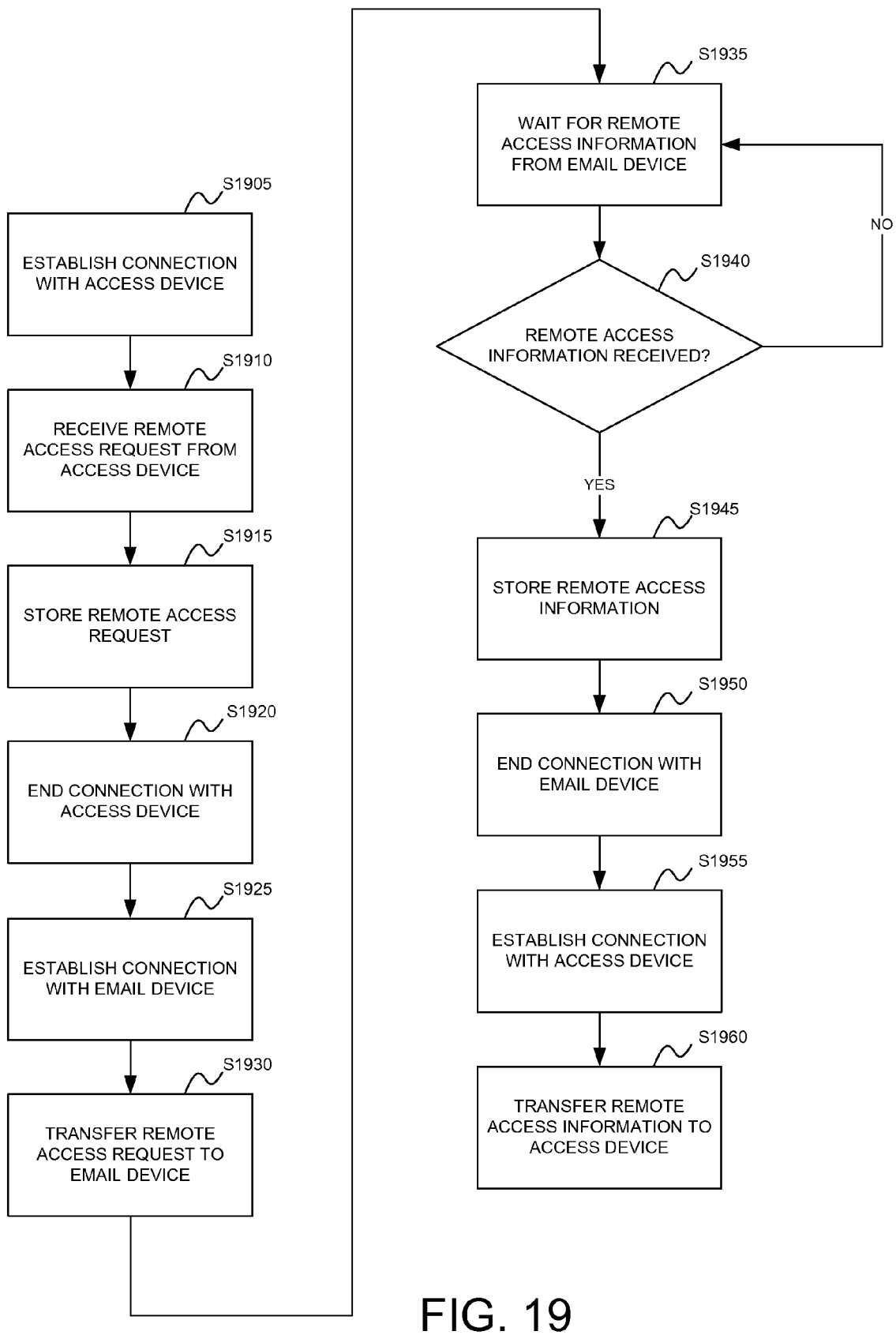
FIG. 19 is a flow diagram illustrating a portable storage device utilizing an email method of transferring remote access information according to an embodiment of the present invention.

FIG. 19 is a flow diagram illustrating a portable storage device utilizing an email method of transferring remote access information according to an embodiment of the present invention. In step S1905, the portable storage device 1610 establishes a connection with the access device 120. In an embodiment of the invention, a user of the access device 120 connects the portable storage device 1610 to an available port on the access device 120.

Upon connecting, the portable storage device 1610 receives a remote access request generated by the access device 120 in step S1910. Then, the remote access request is stored locally by the portable storage device 1610 in step S1915. Next, the portable storage device ends the connection with the access device 120 in step S1920. In an embodiment of the invention, a user does this by physically disconnecting the portable storage device 1610 from the access device 120. In yet another embodiment of the invention, the user physically transports the portable storage device 1610 to the email device 1620 and connects it to the email device 1620 using an available port.

In step S1925, the portable storage device 1610 establishes a connection with the email device. After a connection is made, in step S1930, the portable storage device 1610 transfers the remote access request received from the access device 120 to the email device 1620. Next, the portable storage device 1610 waits for remote access information 312 from the email device 1620 in step S1935. In an embodiment of the invention, the portable storage device 1610 ends the connection with the email device by a user physically disconnecting it from the email device 1620. The portable storage device 1610 then waits for the email device 1620 to receive remote access information while disconnected in step S1935.

A determination is made in step S1940 whether remote access information 312 is received. If remote access information 312 is not received, the portable storage device 1610 continues to wait for the email device 1620 to receive remote access information 312. If remote access information 312 is received, flow proceeds to step S1945, where the portable storage device 1610 receives the remote access information 312 from the email device 1620 and stores the remote access information 312 locally. In an embodiment of the invention, the portable storage device 1610 is first reconnected to an available port on the email device 1620 and then receives the remote access information 312 from the email device 1620 and stores S1945 the remote access information 312 locally in step S1945.

After storing the remote access information 312, the portable storage device 1610 ends S1950 the connection with the email device 1620 in step S1950. In an embodiment of the invention, the user 1220 ends the connection by physically removing the portable storage device 1610 from the email device 1620 and physically transports the portable storage device 1610 back to the access device 120.

Once at the access device 120, the portable storage device 1610 once again establishes a connection with the email device 1620 in step S1955. In an embodiment of the invention, a user 1220 physically connects the portable storage device 1610 to the access device 120 through an available port on the access device 120 in step S1960.

When a connection is made, the portable storage device 1610 transfers S1960 the remote access information 312 from local storage to the access device 120.

Figure 20:
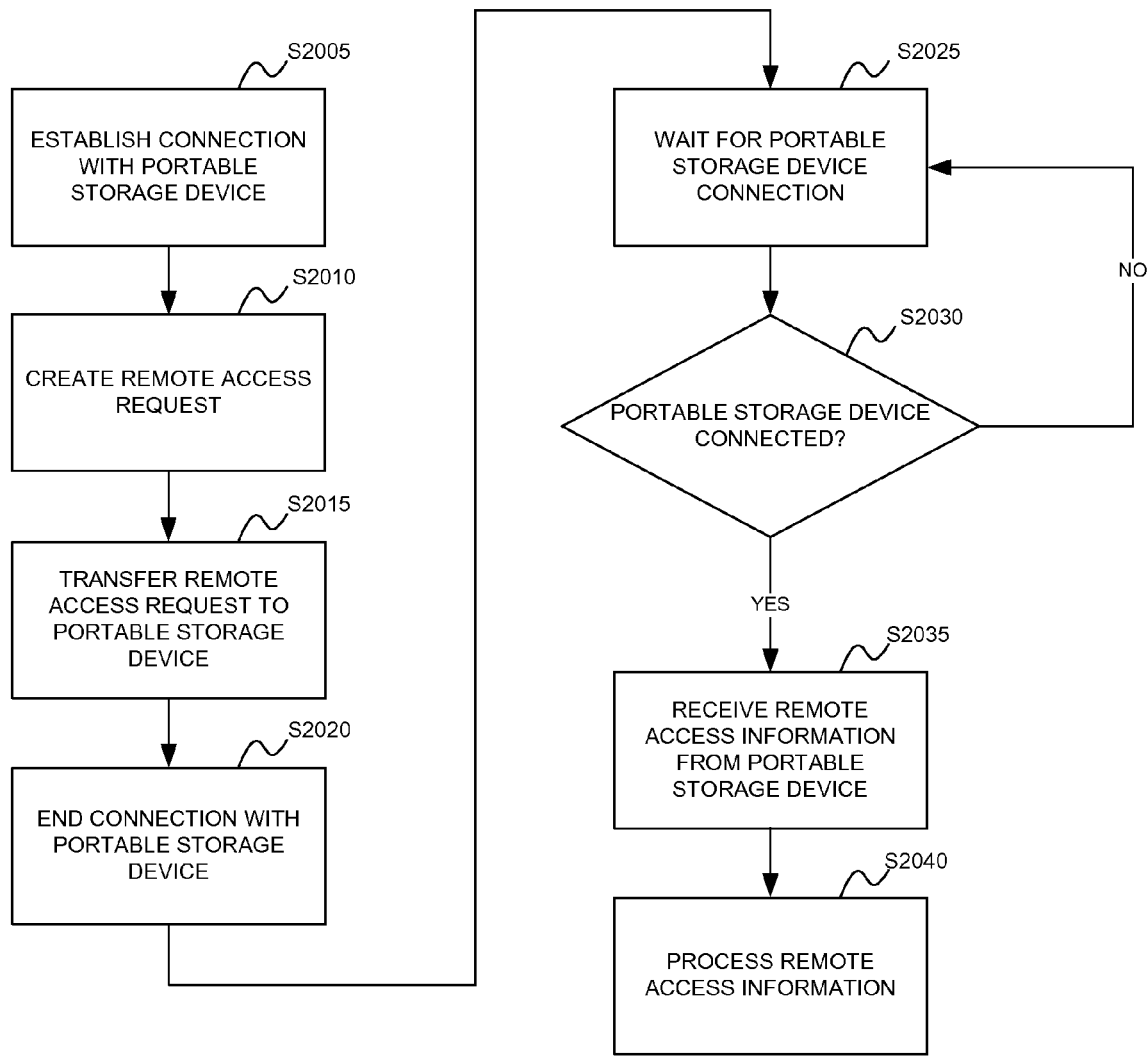
FIG. 20 is a flow diagram illustrating an access device utilizing an email method of transferring remote access information according to an embodiment of the present invention.

FIG. 20 is a flow diagram illustrating an access device utilizing an email method of transferring remote access information according to an embodiment of the present invention. In step S2005, the access device 120 establishes a connection with the portable storage device 1610. In an embodiment of the invention, a user 1220 physically connects the portable storage device 1610 to an available port on the access device 120. Once connected, the access device 120 creates a request for remote access for the remote device 110. Then, in step S2015 the request for remote access is transferred to the portable storage device 1610. The access device 120 ends the connection with the portable storage device 1610 in step S2020. In an embodiment of the invention, a user 1220 ends S2020 the connection by physically disconnecting the portable storage device 1610 from the access device 120.

In step S2025, the access device 120, waits for the connection of a portable storage device 1610 to receive remote access information 312. A determination is made in step S2030 whether a portable storage device 1610 is connected. If no portable storage device 1610 is connected, the access device 120 continues to wait for a portable storage device 1610 to be connected to receive remote access information 312. If a portable storage device is connected, flow proceeds to step S2035, where the access device 120 receives the remote access information 312 from the portable storage device 1610. Then, in step S2040, the remote access information 312 is processed to perform remote access. In an embodiment of the invention, the portable storage device 1610 is the same device connected earlier to transfer the remote access request to the email device 1620. In yet another embodiment of the invention, a user 1220 physically reconnects the portable storage device 1610 to the access device 120 to transfer remote access information 312 received at the email device 1620.

While the present invention has been described with reference to exemplary embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A method for establishing remote access over a network comprising:

connecting, by a first device, to a server over a network for communication with a second device over the network;

sending a request for remote access from the first device directly to the second device over the network by utilizing information provided by the server;

storing, by the second device, a compressed image file comprising:

remote access information, attribute data, and image data, wherein the remote access information stored includes information to remotely access the second device or resources of the second device over the network;

sending the compressed image file with the remote access information to the first device over the network; and accessing, by the first device, the second device or resources connected to the second device using the remote access information stored in the compressed image file.

2. The method of claim 1, wherein the remote access data remote access information stored includes authentication and authorization data that allows the first device specific access and privileges to the second device or resources of the second device over the network.

3. The method of claim 1, wherein the remote access information is encrypted so only the first device can decrypt and use it.

4. The method of claim 1, wherein the compressed image file contains data to graphically depict an image as pertaining to or coming from a particular source.

5. A method for establishing remote access over a network comprising:
   sending, by a first device, a first image data sequence to a server over a network;
   sending, by a second device, a second image data sequence to the server over the network;
   determining whether the first image data sequence is identical to the second image data sequence at the server;
   receiving, by the first device, network contact information for the second device from the server based on the determination;
   sending a request for remote access from the first device directly to the second device using the network contact information;
   storing, by the second device, a compressed image file based on the request for remote access, comprising:
   remote access information,
   attribute data, and
   image data;
   sending the compressed image file with the remote access information to the first device over the network; and
   accessing, by the first device, the second device or resources connected to the second device using the remote access information stored in the compressed image file.

6. The method of claim 5, further comprising:
   sending a notification from the second device to the first device that the request for remote access has been received.

7. The method of claim 5, wherein the remote access information stored includes authentication and authorization data that allows the first device specific access and privileges to the second device or resources of the second device over the network.

8. The method of claim 5, wherein the remote access information is encrypted so only the first device can decrypt and use it.

9. The method of claim 5, wherein the first and second image data sequence can be a single image previously shared between the first device and second device users.

10. The method of claim 5, wherein the compressed image file contains data to graphically depict an image as pertaining to or coming from a particular source.

11. The method of claim 5, wherein determining whether the first image data sequence is identical to the second image data sequence occurs when the second image data sequence is sent to the server before a predetermined time after receiving the first image data sequence at the server or the first image data sequence is sent to the server before a predetermined time after receiving the second image data sequence at the server.

12. A method for establishing remote access over a network comprising:
   sending, by a first device, a first identifier data to a server, wherein the first identifier data includes network contact information of the first device;
   sending, by a second device, a second identifier data to the server;
   determining whether the second identifier data is identical to the first identifier data at the server;
   receiving, by the second device, network contact information for the first device from the server based on the determination;
   sending a request for remote access from the second device directly to the first device by utilizing the network contact information;
   storing, by the first device, a compressed image file based on the request for remote access, comprising:
   remote access information,
   attribute data, and
   image data;
   sending the compressed image file with the remote access information to the second device over the network; and
   accessing, by the second device, the first device or resources connected to the first device using the remote access information stored in the compressed image file.

13. The method of claim 12, wherein the remote access information stored includes authentication and authorization data that allows the first device specific access and privileges to the second device or resources of the second device over the network.

14. The method of claim 12, wherein the remote access information is encrypted so only the second device can decrypt and use it.

15. The method of claim 12, wherein the compressed image file contains data to graphically depict an image as pertaining to or coming from a particular source.

16. The method of claim 12, wherein determining whether the second identifier data is identical to the first identifier data occurs when the second identifier data is sent to the server before a predetermined time after receiving the first identifier data at the server.

17. An apparatus for establishing remote access over a network comprising:
   a receiving unit configured to receive requests for remote access from devices over a network;
   a storing unit configured to store remote access information in a compressed image file comprising:
   remote access information,
   attribute data, and
   image data,
   wherein the remote access information stored includes information to remotely access a device or resources of a device over the network; and
   a sending unit configured to send the compressed image file with the remote access information to a requesting device over the network.

18. The apparatus of claim 17, wherein the remote access information is encrypted so only the requesting device can decrypt and use it.

19. The apparatus of claim 17, wherein the remote access information stored includes identification data identifying a source to the requesting device.

20. The apparatus of claim 17, wherein the remote access information stored includes authentication and authorization data to grant the requesting device access and privileges to devices or resources of devices over the network.

21. The apparatus of claim 17, wherein the compressed image file contains data to graphically depict an image as pertaining to or coming from a particular source.

* * * * *